United States Patent [19]

McNees

[11] 4,048,451
[45] Sept. 13, 1977

[54] ARRANGEMENT FOR MONITORING LIVE CALL DISPOSITION SIGNALS

[75] Inventor: Gary Keith McNees, Monmouth Beach, N.J.

[73] Assignee: Bell Telephone Laboratories, Incorporated, Murray Hill, N.J.

[21] Appl. No.: 668,596

[22] Filed: Mar. 19, 1976

[51] Int. Cl.² .................. H04M 7/00; H04M 3/24
[52] U.S. Cl. .................... 179/18 AH; 179/84 VF; 179/175.2 C
[58] Field of Search ............ 179/175.2 C, 18 AH, 179/18 E, 18 ES, 18 EB, 27 G, 1 MN, 84 VF

[56] References Cited

U.S. PATENT DOCUMENTS

| | | | |
|---|---|---|---|
| 1,864,061 | 6/1932 | Gooderham | 179/175 |
| 2,873,322 | 2/1959 | Vigren et al. | 179/175.2 R |
| 3,313,887 | 4/1967 | Burian et al. | 179/18 EB |
| 3,336,442 | 8/1967 | Casterline et al. | 179/18 ES |
| 3,454,720 | 7/1969 | Minchenko | 179/84 VF |
| 3,525,818 | 8/1970 | Jaeger, Jr. et al. | 179/175.2 C |
| 3,863,216 | 1/1975 | Mila | 179/18 ES X |
| 3,917,915 | 11/1975 | Karras | 179/175.2 C |
| 3,934,095 | 1/1976 | Matthews et al. | 179/18 D |

*Primary Examiner*—Thomas W. Brown

*Attorney, Agent, or Firm*—Howard R. Popper; Frederick W. Padden

[57] ABSTRACT

The reliable detection of call disposition signals to identify the ultimate dispositions of calls switched over a cross-office connection is achieved by attaching monitoring equipment to the sender that has been seized by an incoming trunk circuit of a telephone switching office. Sender release which normally occurs after the completion of outpulsing is inhibited to maintain the trunk in the split condition normally assumed during outpulsing. A tone detector, attached to the called side of the prolonged split, samples the returning call disposition tones or speech signals and allows a call disposition monitor to preliminarily classify them. The output of the tone detector is also sent to a computer for more detailed and complete analysis. If the preliminary categorization indicates that the received signal tone may be part of a disposition category group which requires further sampling and which may allow the calling customer to quickly disconnect, cut-through is delayed for an additional interval to ensure that the computer will have sufficient samples of the incoming signal tones that are free of spurious and random speech and noise energy emanating from the calling side of the split.

13 Claims, 8 Drawing Figures

ARRANGEMENT FOR MONITORING LIVE CALL DISPOSITION SIGNALS

BACKGROUND OF THE INVENTION

This invention relates to call disposition signal monitoring and more particularly, to an arrangement and method for the reliable detection of call progress tones transmitted through a telephone central office and indicative of the ultimate disposition of a live call switched therethrough. The achievement of reliable mechanized tone-detection is important in studying telephone network behavior characteristics for performance measurement, fault isolation and maintenance.

In the past, arrangements for detecting call progress and disposition tones in a live call environment in a tandem or toll switching center have been employed which bridged a tone detector across the tip and ring leads of the cross-office transmission path associated with the call to be monitored. Typically, a tone detector is attached to a circuit which has been seized by the incoming terminal path circuit, i.e., line or trunk circuit in order to establish the cross-office connection. For example, in a common control switching office the tone detector is attached to a sender after the latter has been seized for use by the incoming trunk circuit in the tandem or toll switching office. A tone detector thus bridged across the transmission path is able to detect and, if necessary, to record the received disposition signal tones which indicate the ultimate disposition of the call, e.g., busy, reorder, recorded voice announcement, called customer answer, etc. While the above-described arrangement is successful in detecting live call disposition signals, it has the disadvantage that the tone detector is exposed to several possible sources that may interfere with reliable detection and disposition categorization.

First, the calling party may generate random and spurious speech energy while the tone detector is bridged on and may thus interfere with proper and reliable signal tone detection. Secondly, the calling party, upon hearing a tone that signifies the unavailability of the called circuit, e.g., busy tone or reorder tone, may release the established connection before the monitoring equipment has sampled a sufficient number of periods of the disposition tones in order to make a correct determination thereof.

It would therefore be advantageous to provide an arrangement for reliably monitoring call disposition signals without exposing the tone detector to speech or noise interferences emanating from the originating source and without risking prematue termination by the calling party before a proper determination of the call disposition can be made.

SUMMARY OF THE INVENTION

The foregoing and other objects are achieved in accordance with the principles of my invention, in one illustrative embodiment thereof, in which call monitoring equipment is switched into a toll or tandem cross-office connection after the sender associated with the call being set up has successfully completed outpulsing towards the called party's switching office. Whereas normal crossbar tandem sender operation requires that the tandem cross-office path be held open by the sender at the incoming trunk circuit until the completion of outpulsing, the addition of my monitoring equipment inhibits the normally-occurring sender release after outpulsing and thereby prevents an outgoing trunk circuit from being cut through to the calling party.

In the crossbar tandem office, the incoming trunk circuit seizes a sender via a sender link and controller circuit. During this seizure period and subsequent thereto the tip and ring transmission path of the originating trunk circuit is maintained in a split condition so that the calling and called sides thereof are isolated from each other and are separately connected to the sender. Incoming pulses are registered in the sender and then are transferred from the sender to an associated marker over a marker connector. The marker examines the called number information and determines the destination of the call. The marker then finds an idle outgoing trunk circuit, reserves and tests a tandem cross-office connection and then signals the sender to outpulse the called party's number towards the destination-end switching office. At this point, the sender before normally releasing from the connection, signals the originating trunk circuit to remove the split and cut through the connection to the called party.

In accordance with my invention, any of the several senders of the tandem office may bid on a first-come first-served basis in a call selector for connection through a monitor connector circuit to a call disposition monitor. Upon the successful completion of sender outpulsing the monitor connector prevents the release of the sender from the trunk circuit and thereby inhibits the trunk circuit from cutting through the cross-office connection, thereby maintaining the trunk in the split condition. The tip and ring leads toward the called end of the trunk are thus available through the sender link to be connected directly with the call disposition monitor via the monitor connector circuit. The call disposition monitor samples signals such as busy, reorder, recorded voice announcement, audible ring, etc., from the destination and/or intermediate office and, by examining the ON-OFF periods of the first one and a half cycles of the output of a tone detector, performs a preliminary categorization of the cell dispostion signals. At the same time these signals are also advantageously transmitted to a computer, via a data set, for more accurate and detailed analysis.

Preliminary categorization of the disposition signals permits early release of the sender and restoration of talking path through the incoming trunk circuit. My arrangement thus has the advantage of isolating the detector from spurious and random speech and noise energy generated at the calling side of the split. In addition, since the cross-office connection remains split until a preliminary categorization by the call disposition monitor circuit has been achieved, premature abandonment by the calling customer is prevented. The detector may however still remain attached to the tip and ring leads toward the called side of the trunk even after trunk circuit restoration in order to further obtain signal tone samples to be transmitted to the aforementioned computer.

Further, in accordance with my invention, certain call disposition signals are accorded a longer noise-free detection interval so that they may be successfully and more accurately analyzed at the computer. Thus, the audible ring and voice call dispositions either from the called customer or from a recorded voice announcement, may be more readily distinguished from each other and require quick cut-through to prevent clipping of the initial speech response. The busy-reorder disposition signal group, on the other hand requires a greater interval to distinguish within the group between busy and reorder signals and between signals in that group and the voice disposition group. Thus, upon detection of a signal in the busy-reorder disposition group, trunk cut-through is additionally delayed by my arrangement for another interval so that a minimum number of noise-free cycles of signal tone may be obtained for detailed analysis by computer. Upon the conclusion of this additional interval, the sender is released and the trunk circuit is restored from its split condition so that the calling customer is now able to hear the busy or reorder one. Selective preliminary categorization intervals, thus utilized, enable the cross-office connection to be restored at the incoming trunk circuit as soon as possible. At the same time, the computer is assured a noise-free sample of the disposition signals for some initial interval and may remain attached to the connection after cross-office cut-through has been established in the incoming trunk circuit in order to allow the computer to more accurately and reliably analyze the call disposition.

It is thus as aspect of the operation of the circuit of my invention that the amount of delay-before-cut-through is varied in accordance with a preliminary categorization of the detected call disposition signals so that the more-difficult-to-detect signals and likely-to-be-abandoned signals may be accorded sufficient time to be accurately classified. The delay in cut-through thus assures that the calling customer will not abandon the call upon hearing a call disposition signal that the apparatus has not had sufficient time to classify. Since the effect of the brief delayed cut-through on the calling party is virtually unnoticeable, my arrangement provides a mechanized live-call monitoring capability comparable in accuracy to present-day manual service observing arrangements.

BRIEF DESCRIPTION OF THE DRAWING

The foregoing and other objects of my invention may become more apparent from the ensuing description and drawing in which:

FIG. 8 shows the schematic interrelationship among FIGS. 2 through 7.

Figure 5:
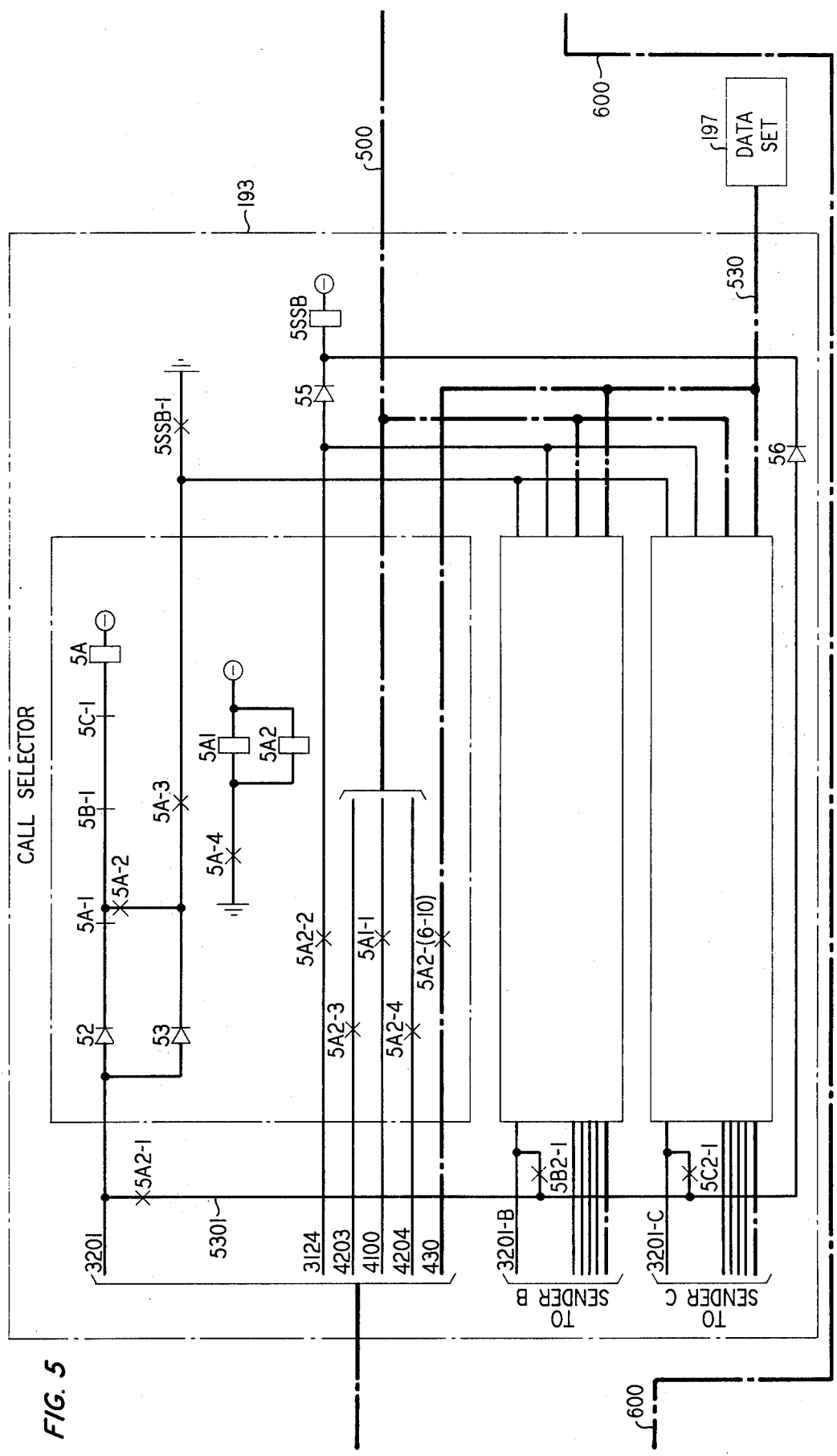
FIG. 5 schematically represents a call selector circuit which attaches the monitoring equipment to a sender upon request.

In my drawing relays are designated with a prefix number which indicates in which of the sheets of the drawing the winding of the relay of interest appears, e.g. the winding of relay 5A2 will appear in FIG. 5.

Relay contacts are designated by the relay name and an appended contact number. Thus, 5A2-7 designates the seventh contact of relay 5A2. Furthermore, multiple consecutively-sequenced relays are represented by only one relay winding but are designated by the first and last members of the relay sequence whereby it is understood that each of the relays of the sequence is intended. For example, a relay winding labeled 7(A3-C3) in actuality represents relays 7A3, 7B3, and 7C3 which are multipled together at the point indicated on the drawing. Similarly the contacts of each set of multiple relays are appended to the relay name, e.g. 7(A3-C3)-4 designates relay contacts 7A3-4 and 7C3-4 multipled together at the appropriate point on the drawing. It is to be noted in this regard that in FIG. 6, the above convention is adopted where, in addition, relay letter designations are selected to show correspondence among associated multiple relay sets belonging to different relay groups. Thus in FIG. 6 the appearance of relays 6(A3-C3) wired in series with relay contacts 5(A-C)-5 to ground should be interpreted as relay 6A3 in series with relay contact 5A-5 to ground, relay 6B3 in series with contact 5B-5 to ground and relay 6C3 in series with contact 5C-5 to ground.

GENERAL DESCRIPTION OF THE INVENTION

Figure 1:
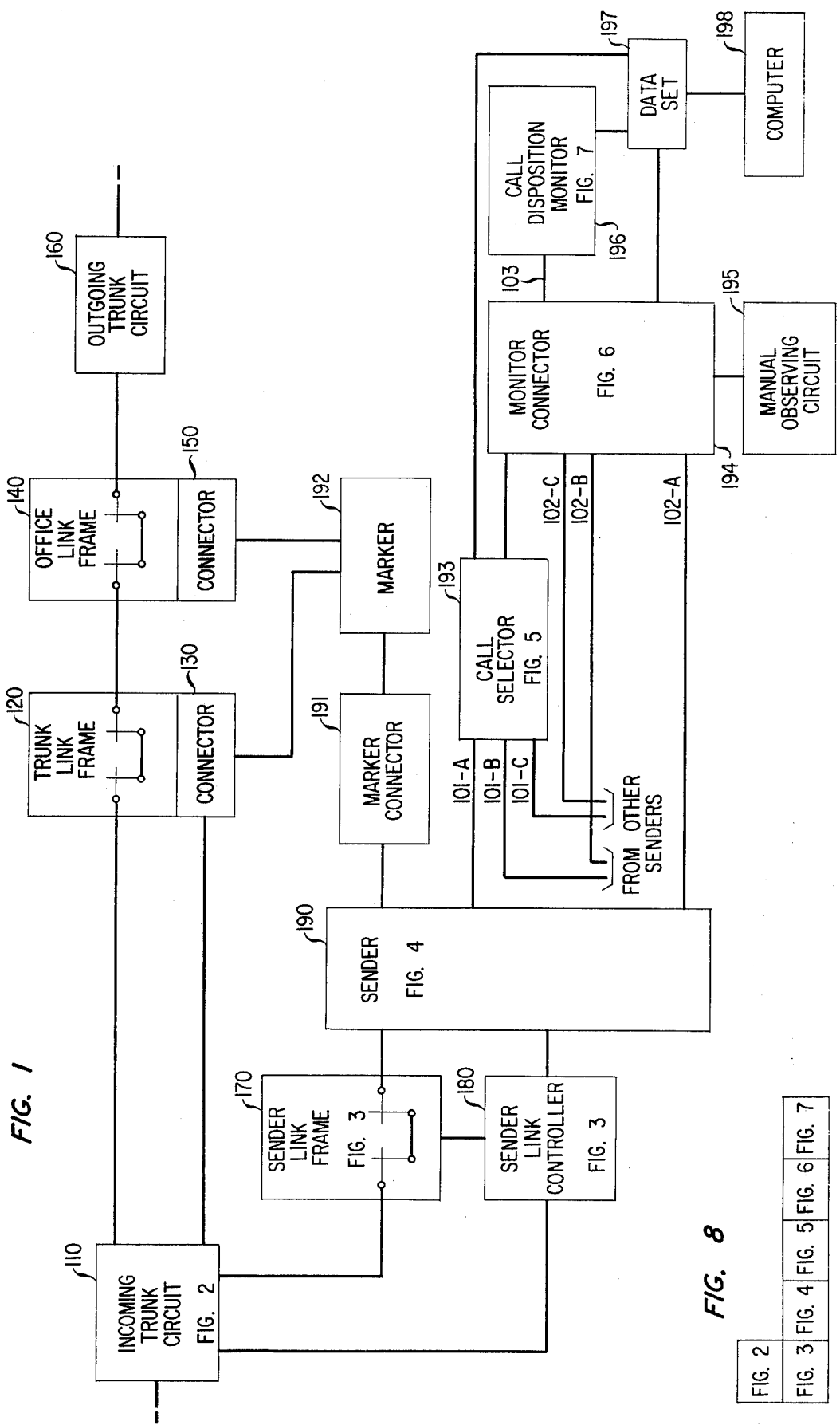
FIG. 1 is a schematic representation of the switching equipment of a tandem or toll crossbar switching office utilizing the monitoring euipment of my invention.

FIG. 1 schematically depicts in lighter outline the principal components of the well-known crossbar tandem office as described in the *Bell System Technical Journal* articles of August 1942, pages 286–294 and January 1956, page 91–108 and in somewhat greater detail in W. W. Carpenter et al U.S. Pat No. 2.093,117, issued Sept. 14, 1937. Briefly, a given incoming trunk circuit 110 has two major appearances in a crossbar tandem office; one on the trunk line frame 120 used for the talking connection and one on the sender link frame 170 used for passing call set-up information to common control equipment. The trunks are arranged in decades on the sender link frame 170 to permit the sender link to provide the sender with information which is common to a group of ten trunk circuits.

Sender link frame 170 consists to two sets of crossbar switches designated as primary and secondry. The incoming trunks appear on the primary switches and the senders on the secondary switches. As soon as incoming trunk circuit 110 is seized, it signals sender link controller 180 to connect an idle sender, in this case sender 190, for registering the incoming pulses. Sender link controller 180 tests for and selects an idle sender 190 and sets up the connection through the crossbar switches of sender link frame 170. As soon as the sender 190 is attached, it signals the originating office (not shown) to commence pulsing. When enough digits are received to select an outgoing trunk circuit 160, sender 190 signals marker connector 191 to seize an idle marker 192. When the latter is connected, sender 190 passes the called number information to the marker. Using these indications the marker determines route information and passes outpulsing instructions to sender 190. Marker 192 seizes connection 150 which has access to office link frame 140 on which the outgoing trunk group is terminated.

As soon as it is connected to office link frame 140, marker 102 does two things simultaneously. First, it seizes connector 130 which serves trunk link frame 120 on which incoming trunk circuit 110 is terminated. Second, it starts testing for an idle outgoing trunk, and through sender 190, instructs incoming trunk circuit 110 to connect to trunk link frame connector 130, which, in turn, cuts through to marker 192 a plurality of test leads (not shown) associated with links that serve the switch on which incoming trunk circuit 110 is terminated. Marker 192 also signals sender 190 to release marker connector 191 which, in turn, releases its connection to marker 192.

For the particular call in progress, marker 192 maintains a path to sender 190 via trunk link connector 130, incoming trunk circuit 110 and sender link frame 170. Marker 192 independently tests the connections across trunk link frame 120 and across office link frame 140. Marker 192 then proceeds to set up the connection from incoming trunk circuit 110 to outgoing trunk circuit 60, tells sender 190 that a cross-office path has been established and then releases from trunk link frame 120 and office link frame 140. Sender 191 then sends a seizure signal toward the destination end office and outpulses in accordance with its direction from marker 192. After outpulsing is completed, the sender releases, the talking path through incoming trunk circuit 110 is restored and the call is under control of incoming trunk circuit 110.

Sender link frame 170, sender link controller 180, sender 190, marker connector 191 and marker 192 are described in greater detail in the aforementioned U.S. Pat. No. 2,093,117 issued to W. W. Carpenter on Sept. 14, 1937. As described therein with respect to the terminating sender link and control circuit, the incoming trunk circuit is split with tip and ring leads being derived on either side of the split and presented to the sender through the associated sender link frame.

In accordance with the principles of my invention, call selector 193 is seized by one of a group of assigned senders such as sender 190, on a first-come first-served basis. Thus, sender 190 may seize over led group 101-A while other senders (not shown) may seize on lead groups 101-B or 101-C. Assuming sender 190 is selected, monitor selector 193 closes a relay contact in monitor connector 194 and cuts through there to lead group 102-A from sender 190. In particular, lead group 102-A associated with sender 190 obtains the tip and ring leads derived from the called side of the split in the incoming trunk circuit. These leads, among others, are presented to monitor connector 194 and are continued over lead group 103 to call disposition monitor 196 wherein signal tones indicative of a call disposition are detected and preliminarily classified. Significantly, when monitor connector 104 is attached to sender 190 it prevents the latter from releasing from the incoming trunk circuit 110 although outpulsing has already been completed. This allows call disposition monitor 196 sufficient time to sample the call disposition signals in an environment that is free of any speech or noise interference emanating from the calling side of the split at incoming trunk circuit 110.

The detected signal tones are also transmitted via data set 197 to a downstream computer 198. Verification of the accuracy of operation of call disposition monitor 196 may be achieved by additionally sending to the computer the categories preliminarily determined on a particular call by call disposition monitor 196. The call disposition monitor 106 provides an additional noise-free timed interval if the preliminary analysis indicates that the cell disposition signals may belong to one of several categories in a group of hard-to-distinguish call dispositions.

When the preliminary sampling period is over, monitor connector 194 restores sender 190 to normal but does not release it. The cross-office path is cut through at incoming trunk circuit 110 but call disposition monitor 196 remains bridged onto the tip and ring by virtue of lead groups 103 and 102-A and sender 190 so that further samples of the tones may be analyzed by computer 198. The accuracy of the call disposition signal categorization by monitor 196 and final disposition by computer 198 may be evaluated by comparing the results obtained to results of a conventional manual observing circuit 195 which may be attached to monitor connector 195.

DETAILED DESCRIPTION

Figure 2:
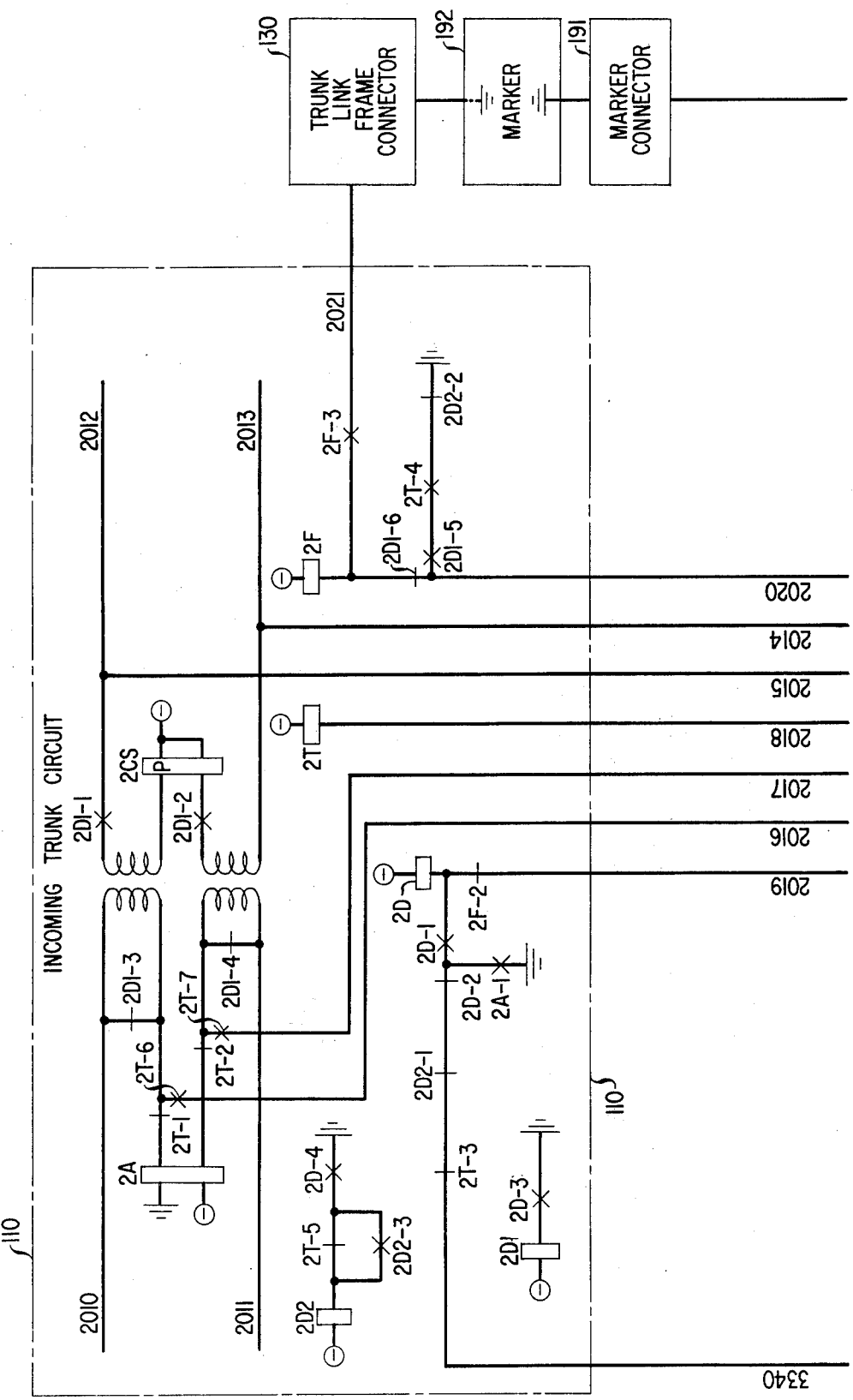
FIG. 2 details relevant portions of an incoming trunk circuit of the switching office of FIG. 1.
Figure 3:
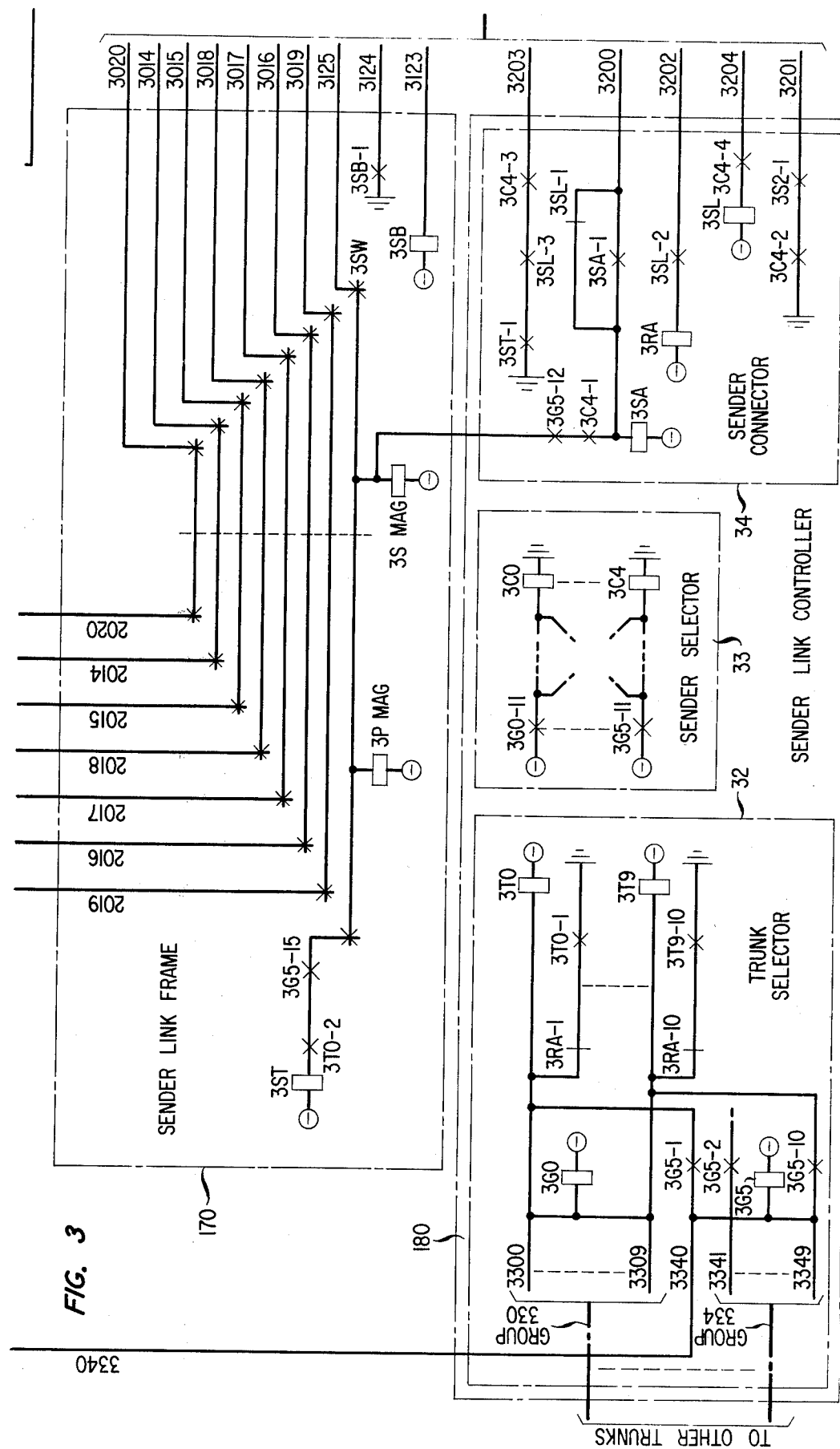
FIG. 3 details relevant portions of the sender link frame and sender link controller circuit used in the aforementioned switching office to attach a sender to the incoming trunk circuit.

In one illustrative embodiment of my invention, incoming trunk circuit 110, detailed in FIG. 2, is seized when the originating office (not shown, but connected to the leads 2010 and 2011) makes a request for service by closing the circuit through the double winding relay 2A over tip and ring leads 2010 and 2011. It is assumed by way of illustration that sender link frame 170 of FIG. 3 serves five trunk groups, each consisting of ten trunks. When, due to contacts 2T-1 and 2T-2, relay 2A operates it provides a ground via contacts 2A-1, 2D-2, 2D2-1 and 2T-3 on lead 3340 of lead group 334 of trunk selector 32 (FIG. 3). Ground on led 3340 operates group relay 3G5 and is extended over contact 3G5-1 to operate relay 3T0. Relays 3G5 and 3T0 respectively indicate the group number and the trunk circuit number of a given trunk circuit. Relay 3T0 operated locks to ground over its make contact 3T0-1 and break contact 3RA-1.

Relay 3G5 operated will, in turn, at contact 3G5-11 operate a sender group relay chosen for illustrative purposes to be relay 3C4 in sender selector 33. The details of trunk selector 32 and sender selector 33 are more particularly described in the *Bell System Technical Journal* article of June 1939, pages 321–326. As described therein and in the aforementioned Carpenter patent, the operation of a sender group relay such as relay 3C4 causes the appropriate sender select magnets (not shown) to operate in sender link frame 170. Assuming that the second sender of a four-sender group has been selected for seizure, a 3S2 relay (winding not shown) of sender selector 33 is operated, applying ground at its make contacts 3S2-1 to lead 3201 of sender connector 34. The ground on lead 3201, in turn, operates relay 4SC1 in sender 190 of FIG. 4. The operation of relay 4SC1, through contact 4SC1-2, in turn, grounds lead 3200 which at sender connector 34, FIG. 3 operates relay 3SA via break contact 3SL-1 and locks the relay via contact 3SA-1.

In addition, the primary hold magnet 3P MAG and the secondary hold magnet 3S MAG of sender link frame 170 are operated via the lead 3200 through operated contacts 3C4-1 and 3G5-12. The operation of these magnets causes leads 2014 through 2020 to be switched through from incoming trunk circuit 210 to corresponding leads 3014 through 3020 to sender 190. Relay 3ST in sender link frame 170 is operated via ground from lead 3200, over make contacts 3G5-15 and 3T0-2 of their respective operated relays. Ground presented on lead 3200, as described earlier, is also looped back through operated switch contact 3SW and onto lead 3125 in sender link frame 170 to sender 190 (FIG. 4) and therein extended over make contact 4SC1-4 of lead 3204 back to sender connector 34 (FIG. 2) and thence over make contact 3C4-4 to operate relay 3SL therein. Relay 3SL in sender connector 34 is thus operated only after trunk leads 2014 through 2020 have been cut through by sender link frame 170 to sender 190.

Contacts 3ST-1, 3SL-3 and 3C4-3 extend a ground over lead 3203 to sender 190 which is forwarded therein on contacts 4SC1-1 to relay 40N1. Relay 40N1, in turn, operates relay 40N3 over contact 40N1-1 and, in turn, presents a ground via contact 40N3-3 on lead 3123 which at sender link frame 170 operates relay 3SB indicating that the sender has been seized for use. Lead 3124 in sender link frame 170 is presented with a ground via make contact 3SB-1 and make contact 4SRE-2 which in turn operates relay 40N2. It is noted that relay 4SRE had previously been operated when contact 4SC1-5 was closed. Relay 40N2 operated locks to ground over contacts 4AV4-2 and 40N2-1 and extends the ground appearing on lead 3124 over a path comprising make contact 4SRE-2, break contct 4AV4-3 and make contact 40N2-3 to lead 3125. Operation of relay 40N2 thus ensures that ground is maintained on lead 3125 in sender link frame 170 to hold magnets 3P MAG and 3S MAG of sender link frame 170 thereby maintaining the switched-through connections. Furthermore, relay 40N2 at lead 4203 causes the operation of relay 4AVA over the path from ground and over contacts 40N2-4 and 4AV1-2.

Relay 40N2 via make contact 40N2-2 and make contact 4SC1-3 on lead 3202 of sender 190 also grounds lead 3202 which at sender connector 34 operates relay 3RA over make contact 3SL-2. The operation of relay 3RA removes ground from the trunk circuit relay 3TO in trunk selector 32 because of break contact 3RA-1. In addition, when relay 40N1 in sender 190 is operated, ground is presented on lead 3018 through operated make contct 40N1-2 and break contacts 4CK2-2 and 4AV4-4. This ground is extended over lead 3018, through sender link frame 170 and over lead 2018 to incoming trunk circuit 110 (FIG. 2) which operates relay 2T. Relay 2T operated (FIG. 2) cuts off ground that had been presented over make contact 2A-1 break contacts 2D-2, 2D2-1 and 2T-3 onlead 3340. Thus, trunk circuit group relay 3G5 of sender link controller 180 in trunk selector 32 (FIG. 3) is released in turn releasing relay 3C4 via contact 3G5-11. Release of the latter relay releases relay 3SL via contact 3C4-4 and relay 4SC1 via contact 3C4-2 at lead 3201. Release of relay 3SL causes the release of relay 3RA via contact 3SL-2 while release of relay 4SC1 remoes ground from leads 3200 via contact 4SC1-2 causing relay 3SA to release, thereby releasing sender link controller 180.

The operation of the 2T relay (FIG. 2) in incoming trunk circuit 110 transfers signals appearing on incoming leads trip and ring 2010 and 2011 from the 2A relay windings to corresponding leads 2016 and 2017 of trunk circuit 110 over contacts 2D1-3 and 2T-6 and 2D1-4 and 2T-7, respectively, and over leads 3016 and 3017 at sender link frame 170 to sender 190. The make contacts 40N3-1 and 40N3-2 in leads 3016 and 3017 of sender 190 connect relay 4L to tip and ring conductors 2010 and 2011 causing a reversal of polarity of appear at the originating switching center. When sender 190 is ready to receive pulses from the originating switching center it again reverses the polarity before slow-release relay 4SRE has had time to release over contact 4L-1.

After the sender has received the office digits of the called number over lead 3016 and 3017 at pulse receiver 473, it calls in marker 192 to set up a connection to outgoing trunk circuit 160 as previously described with regard to FIG. 1. In establishing the location of the incoming trunk circuit 110 appearing on trunk link frame 120, a ground in marker 192 (FIG. 2) via marker connector 191 operates relay 4DC thereby supplying ground via contact 4DC-1 to lead 3020 through sender link frame 170, to lead 2020 of incoming trunk circuit 110, and over break contact 2D1-6 thereby operating relay 2F. Relay 2F operated locks to a ground in marker 192 over make contact 2F-3 in lead 2021 (FIG. 2). This marker ground applied through trunk link frame connector 130 to lead 2021 of the trunk is continued over leads 2020 and 3020 to hold relay 4DC in sender 190 operated after the connection between sender 190 and marker 192 is broken by the release of marker connector 191 (FIG. 2). When that occurs the sender is still in direct communication with marker 192 over lead 3020, sender link frame 170, lead 2020, contacts 2D1-6 and 2F-3 and through link frame connector 130 to ground. When marker 192 has completed establishing a path through trunk link frame 120 and office link frame 140 it removes ground from lead 2020 over the path described at incoming trunk circuit 110, releasing the 2F relay therein and the 4DC relay in sender 190. This signals the sender that a path through the tandem office has been set up and that it may proceed to outpulse.

Assuming by way of illustration that MF pulsing is used in the toll of tandem switching center, relay 4MFS (not shown) in pulse transmitter 474 is operated after the last digit has been outpulsed. Outpulsing occurs over leads 3015 and 3014 through the break contacts 4AV1-4 and 4AV1-3 respectively, through sender link frame 170 and to corresponding leads 2015 and 2014 of incoming trunk circuit 110 on the called side which has been isolated from the calling side by the presence of make contacts 2D1-1 and 2D2-2 of unoperated relay 2D1. With relay 4MFS thus operated, a ground appears on lead 4240 via contact 4MFS-1 indicating the completion of outpulsing by sender 190.

If automatic live-call disposition monitoring, as will be subsequently described, is not employed, normal sender operation would present the aforementioned ground to lead 4203 via contact 6CM-2 in monitor connector 194 (FIG. 6) and call selector 193 (FIG. 5) to operate relay 4AV1 and to begin sender release from the trunk circuit. As will be described subsequently, if call monitoring in accordance with the principles of my invention is employed, ground will be supplied after a sufficient monitoring interval on lead 4203 from my monitoring equipment to operate relay 4AV1 and to begin sender release. The ensuring description thus relates to the sender release which would occur immediately upon closure of contact 4MFS-1 if no call monitoring is done or which would occur ultimately after a monitoring interval if call monitoring is employed.

Relay 4AV1 operated presents ground on lead 3019 of sender 190 via make contacts 40N2-5, 4AV1-6 on lead 4100 and break contact 4AV4-1 of unoperated relay 4AV4, through sender link frame 170 to lead 2019 and through break contact 2F-2 to operate relay 2D in incoming trunk circuit 110. Relay 2D operated caused relay 2D1 to operate over contact 2D-3, which causes ground to appear on lead 2020 via break contact 2D2-2 and make contacts 2T-4, and 2D1-5. This causes relay 4CK1 to operate in sender 190 because of ground on lead 3020 through contact 4AVA-1. Note that after the operation of 4AV1 ground to relay 4AVA is removed bacause of contact 4A1-2. The operation of relay 4CK1 operates relay 4CK2 in lead 3018 over contact 4CK-1, which relay may then be held via make contacts 4CK2-1 and 40N1-2 to ground. Relay 4CK2 over break contact 4CK2-2 in lead 3018 removes ground from lead 3018 back to lead 2018 at incoming trunk circuit 110 thereby releasing relay 2T therein and restores complete supervision to the truck by cutting through tip and ring leads 2010 and 2011 to supervisory relay 2A via contacts 2T-1 and 2T-2 on the calling side of the split.

Note that when relay 2D1 is operated, tip and ring leads 2012 and 2013 on the called side of incoming truck circuit 110 are cut through to polarized supervisory relay 2CS. Relay 2T unoperated operates relay 2D2 over contacts 2D-4 and 2T-5 thus preventing ground at contact 2D2-1, from being presented on lead 3340. Relay 2D locks to ground over contacts 2D-1 and 2A-1 when supervisory relay 2A is operated. In addition, relay 2D2 operated and locked to ground over contacts 2D2-3 and 2D-4 removes ground from lead 2020 at contact 2D2-2 of incoming trunk circuit 110 causing relay 4CK1 in sender 190 to release on lead 3020 thereby operating relay 4CK3 over contacts 4CK1-2 and 4CK2-3. The operation of relay 4CK3, in turn, operates relay 4AV4 over contact 4CK3-1 which in turn releases relay 4ON2 because of break contact 4AV4-2. Release of relay 4ON2 in turn releases relay 4ON1 over contact 4ON2-1 and then releases relay 4ON3 over contact 4ON1-1. As a result, relay 3SB in sender link frame 170 is released over make contact 4ON3-3 in sender 190. Note, that ground on lead 3124 had previously been removed at contact 4SRE-2 in sender 190 upon the operation of relay 4AV1 which had cut off ground at contact 4AV1-5 to relay 4SRE. The release of relay 3SB allows sender link frame 170 to release and to make sender 190 available for use on a subsequent call. This completes the sender release sequence.

In accordance with the principles of my invention, when call disposition monitoring is to be employed, leads 4203 and 4204 are presented in conjunction with leads 3201, 3124, 4100 and cable 430 at sender 190 as inputs to call selector 193 (FIG. 5). It is assumed for illustrative purposes only, that three senders, i.e., sender 190 and senders B and C (not shown) may bid for the monitoring equipment at call selector 193. Priority selection is established by the sender first to present a ground on its 3201 lead which had been grounded when the sender in question was originally selected by the trunk circuit at sender connector 34 of sender controller 180. Thus, assuming a ground appears on lead 3201 of sender 190 before appearing on either leads 3201-B or 3201-C of senders B or C respectively, relay 5A is then operated over diode 52 and contacts 5A-1, 5B-1 and 5C-1 and in turn operates relays 5A1 and 5A2 over contact 5A-4. When relay 5A operates it locks to the ground appearing on lead 3201 over diode 53 through make contact 5A-2 and break contacts 5B-1 and 5C-1 of unoperated relays 5B and 5C (not shown) associated with senders B and C respectively. It will be recalled that the presence of ground on lead 3201 at sender connector 34 had operated relay 4SC1 in sender 190 which in turn had operated relays 4ON1, 4ON2 and 4ON3.

Figure 4:
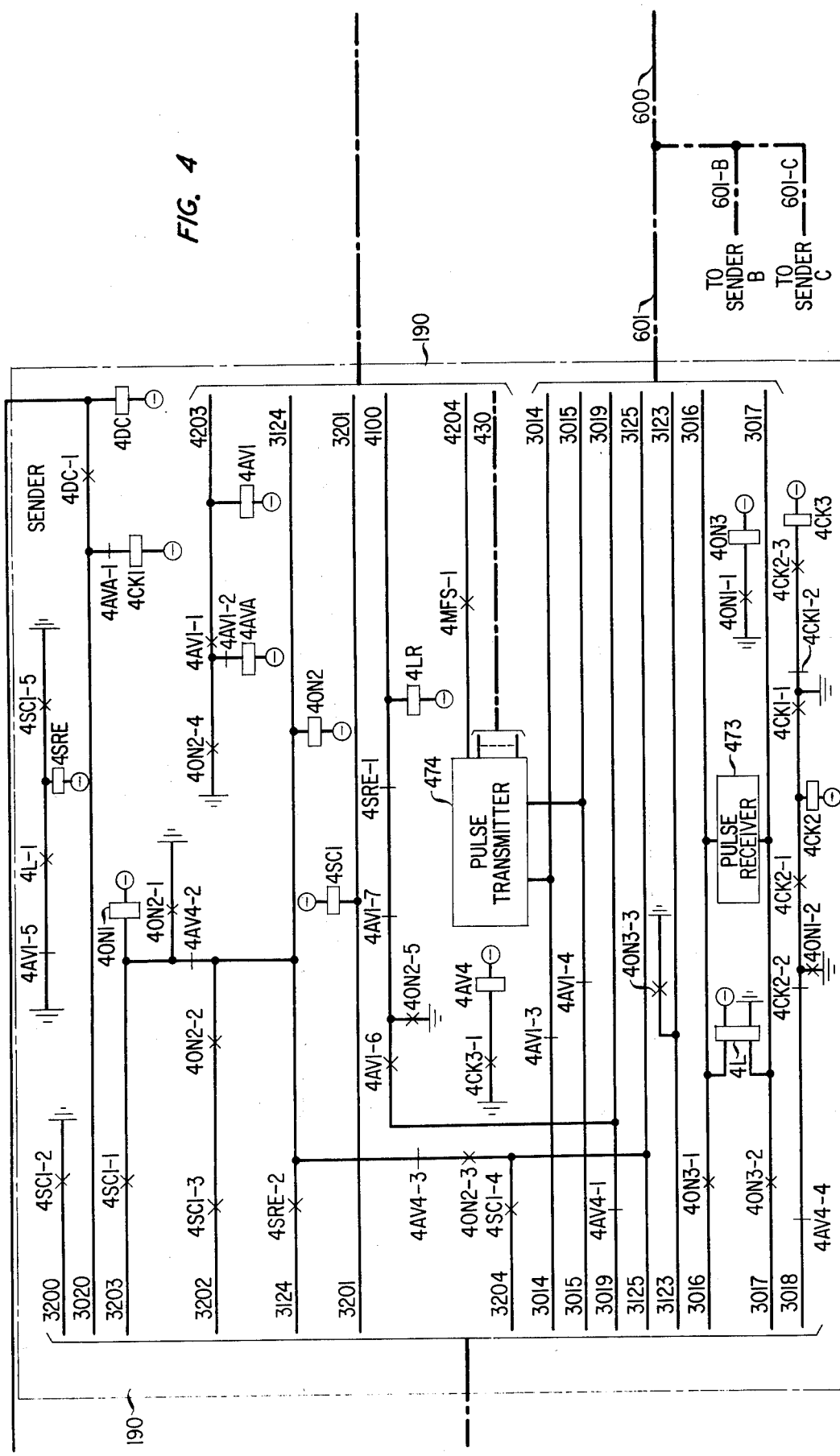
FIG. 4 shows relevant portions of the sender.

Lead 3124 in sender 190 is derived from the ground which holds relay 4ON2 operated over contacts 4ON2-1 and 4AV4-2. Thus, initially when ground appears on lead 3201 it operates relay 5SSB through contact 5A2-1 on lead 5301 and through diode 56. Make contact 5SSB-1 then provides a holding ground for relay 5A via contacts 5A-3, 5A-2, 5B-1, and 5C-1. Although ground is eventually removed from lead 3201 just prior to the release of sender link controller 180 relay 5SSB, which provides a holding path for relay 5A, is held by ground appearing on lead 3124 after relay 4ON2 in sender 190 has been operated, over make contacts 4ON2-1 and 4AV4-2 (FIG. 4). This ground is held at monitor selector 193 by contact 5A2-2 and diode 55. If ground appears first on leads 3201-B or lead 3201-C, instead of lead 320 relay 5A cannot be operated because of break contacts 5B-1 and 5C-1 associated respectively with senders B and C. This essentially locks out all senders belonging to the same monitoring equipment group which are seized after sender 190 has been seized.

Figure 6:
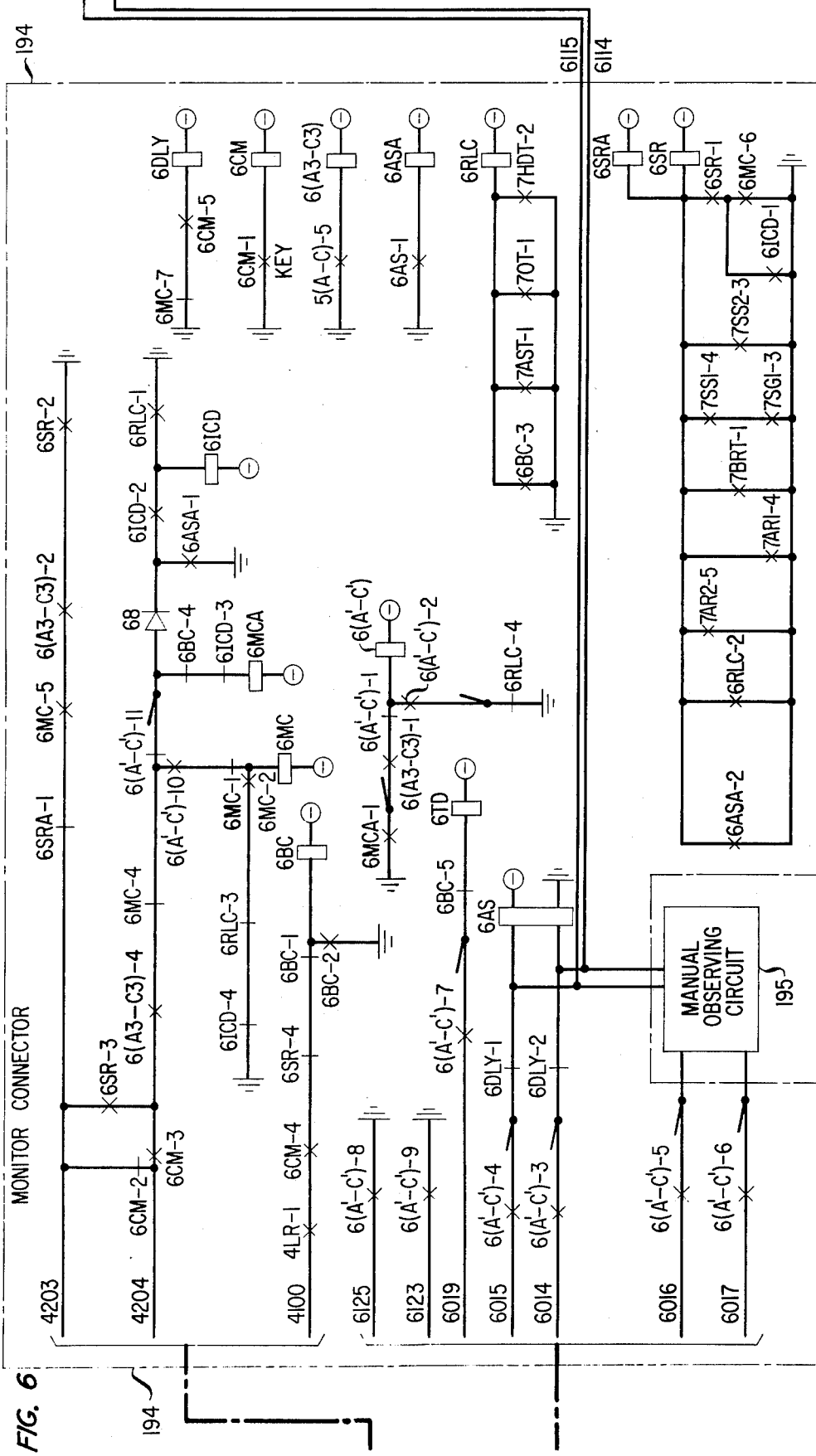
FIG. 6 schematically represents a monitor connector circuit which prevents sender release until preliminary categorization of disposition signals has been completed.

Note that the operation of relays 5A1 and 5A2, over contacts 5A1-1, 5A2-3 and 5A2-4, cut through leads 4100, 4203, and 4204 to the output of call selector 193 over cable 500. Leads 3014 through 3017, 3019, 3123 and 3125 at sender 190 are also derived at cable 601 which is multipled lead-by-lead along with corresponding cables 601-B and 601-C of additional senders B and C of the predetermined group of senders to be monitored, onto cable 600. The latter cable comprises corresponding leads 6014 through 6017, 6019, 6123 and 6125 as shown in FIG. 6.

Figure 7:
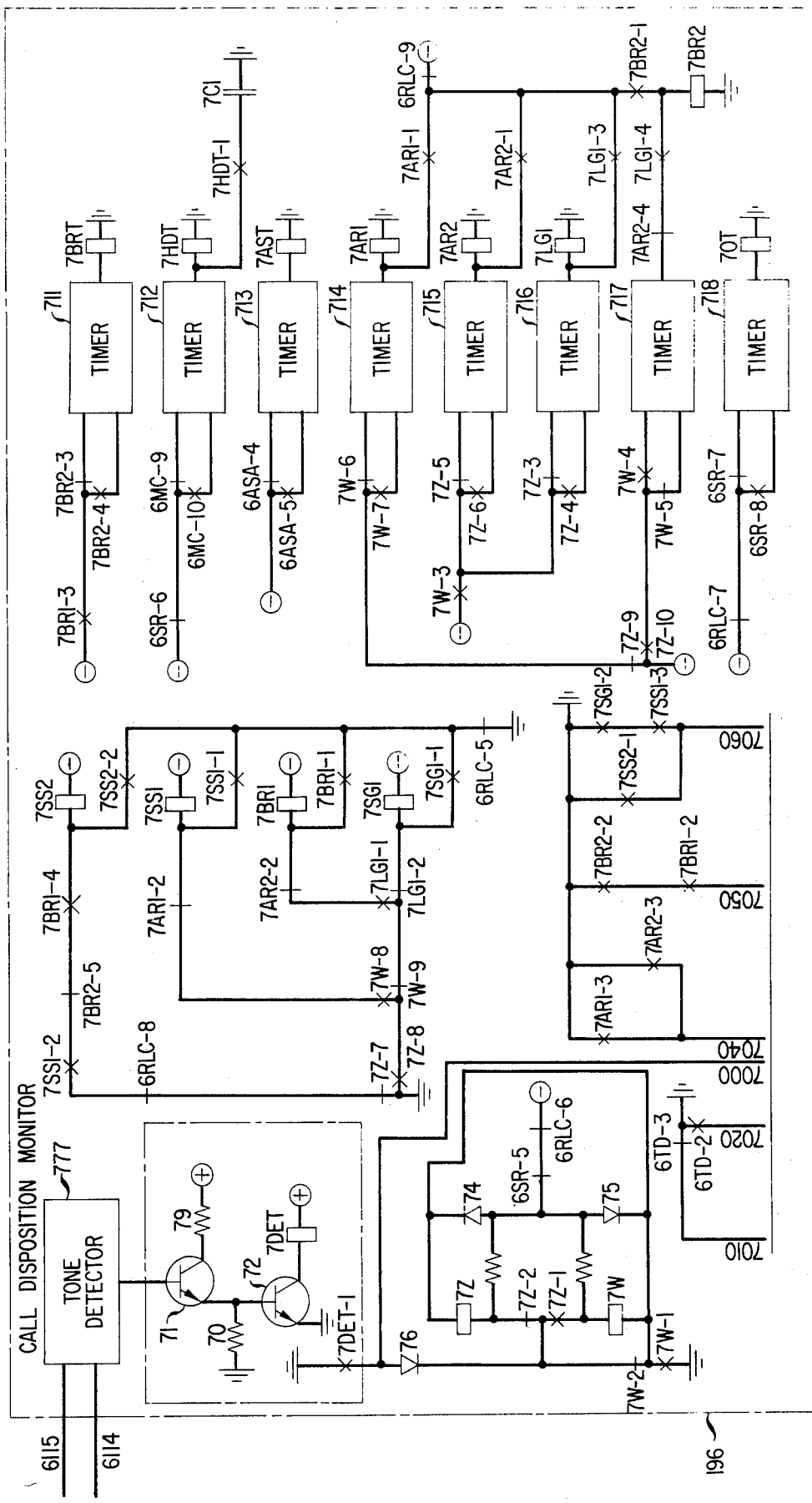
FIG. 7 schematically illustrates a call disposition monitor which samples the tone disposition signals and employs timers to preliminary establish the call disposition.

After sender 190 has seized monitor connector 194, ground is presented from pulse transmitter 474 of sender 190 after outpulsing is completed over contact 4MFS-1 and lead 4204 through monitor selector 193 to monitor connector 194. Note that relay 4AV1 in sender 190 has not yet operated and incoming trunk circuit 110 remains split. Assuming that call disposition monitor 196 is ready for use, key-operated make contact 6CM-1 will be preset closed with relay 6CM operated. Note that in the ensuring description of FIGS. 6 and 7, all relay designations containing the letters A, B and C correspond respectively to sender 190, sender B and sender C associated with call selector 193 of FIG. 5. Also note that the operation of one of relays 5A through 5C in monitor selector 193 will operate the corresponding one of relays 6(A3-C3) over contacts 5(A-C)-5 respectively. Thus, the ground on lead 4204 will pass through make contacts 6CM-3 and 6(A3-C3)-4 and break contacts 6MC-4, 6(A'-C')-11, 6BC-4 and 6ICD-3 to operate relay 6MCA. Relay 6MCA in operating presents a ground to relay 6(A'-C') via make contacts 6MCA-1, 6(A3-C3)-1 and break contacts 6(A'-C')-1.

Relay 6(A'-C') in operating is held to ground over make contact 6(A'-C')-2 and break contact 6RLC-4. In addition, relay 6(A'-C') cause relay 6MC to operate by providing the ground on lead 4204 from sender 190 over make contact 6(A'-C')-10 and break contact 6MC-1. Relay 6MC then locks to ground via contact 6MC-2 and break contacts 6RLC-3 and 6ICD-4. Furthermore, make contacts 6(A'-C')-9 and 6(A'-C')-8 each presents a ground on leads 6123 and 6125 respectively corresponding to leads 3123 and 3125 in sender link frame 170 to hold relay 3SB thereof operative in order to prevent reseizure of sender 190 during the initial interval of operation of call disposition monitor 196 and to maintain the linkage between incoming trunk 110 and monitor connector 194 via sender link frame 170 over cable 600 after sender 190 has been normalized, i.e. returned to its unoperated state but not released, in response to the operation of relay 4AV1.

The operation of relay 6(A'-C') releases relay 6MCA over contact 6(A'-C')-11 and provides cut-through paths between monitor connector 194 and sender link frame 170 for all the leads comprising cable 600, i.e., leads 6014–6017, 6019, 6123 and 6125 over contacts 6(A'-C')-3 through 6(A'-C')-9 respectively. As long as relay 6MC is operated, relay 6DLY, previously held by contacts 6MC-7 and 6CM-5, is released causing leads 6015 and 6014 on break contacts 6DLY-1 and 6DLY-2 to be cut through to relay 6AS of monitor connector 194 and, via correponding leads 6115 and 6114, to call disposition monitor 196 in FIG. 7. In addition, the corresponding leads 2015 and 2014 attached to the called side of the split in incoming trunk circuit 110 and the leads 2010 and 2011 attached to the calling side thereof may be supplied over lead 6014 through 6017 to a conventional manual observing circuit 195 to facilitate a comparative analysis of the accuracy of my monitoring arrangement in automatically determining call disposition catergories.

Sender 190 remains held by monitor connector 194 and maintains the trunk circuit split until an initial tone detection sampling period of conventional threshold tone detector 777 is complete or until receipt of a reverse battery signal on the outgoing tip and ring on leads 6015 and 6014, whichever comes first. In either situation sender 190 is normalized, i.e., held inoperative while its linkage to sender link frame 170 on the leads comprising cable 600 is used to continue call monitoring after the split condition of incoming trunk circuit 110 has been restored. This enables downstream computer 198 (FIG. 1) to analyze signals received during an initial period when trunk circuit 110 is split and to receive further signal tones even after trunk circuit 110 has been restored in order to enable more detailed and accurate analysis. This analysis need not be done in real time. During the initial period, signal tones are received in the absence of any possible spurious speed or noise energy emanating from the calling side of the incoming trunk circuit on leads 2010 and 2011 of trunk circuit 110.

Relay 6AS operates upon battery reversal due to answer supervision appearing on the leads 6015 and 6014 and will remain operated as long as the reversal is present. Sixty milliseconds after relay 6AS operates, the slow-operate, slow-release relay 6ASA operates over contact 6AS-1. Relay 6ASA absorbs line reversals of less than 60 milliseconds and remains operated unless the reversal is removed for longer than 140 milliseconds. Relay 6ASA operated, operates relay 6SR over contact 6ASA-2 to normalize sender 190 as will be described hereinafter and to thereby cut through the talking path through incoming trunk circuit 110 as described supra in conjunction with the operation of relay 4AV1 in sender 190. In addition, the operation of relay 6ASA activates a 10 second timer 713 (to be described hereinafter) over contacts 6ASA-4 and 6ASA-5. When timer 713 times out, relay 7AST operates and causes relay 6RLC to operate over contact 7AST-1 and relay 6SR and slow-operated relay 6SRA to operate over contact 6RLC-2, releasing monitor connector 194 from its linkage over cable 600 to sender link frame 190.

Sender normalization after relays 6SR and 6SRA have been operated is achieved by briefly providing a ground e.g., for 100 milliseconds, on lead 4203 via make contact 6SR-2, and make contacts 6(A3-C3)-2 and 6MC-5 and break contact 6SRA-1. Inasmuch as it is assumed for this illustrative embodiment that sender 190 is employing MF outpulsing, it is necessary to present ground to lead 4203 by the route just described because often the ground supplied from pulse transmitter 474 of sender 190 over lead 4204 is removed after a short interval. Prior to this interval, of course, make contact 6SR-3 can directly bridge lead 4203 to lead 4204. As described supra, operation of the 4AV1 relay in sender 190 causes the operation of the 2D relay at incoming trunk circuit 110 thereby establishing cut-through from the calling to the called side of that circuit. This does not, however, impair the linkage of monitor connector 194 through sender 190 to send link frame 170, since the sender has only been normally and not released and relay 3SB remains operated.

In the aforementioned situation where relay 7AST has operated and thereby has operated relay 6RLC, release of the aforementioned linkage to sender link frame 170 is achieved as follows. Relay 6RLC operated, operates relay 6ICD over contact 6RLC-1 and via contact 6RLC-4 releases the one of relays 6(A'-C') which had been operated during the monitoring of this particular call. Relay 6(A'-C') released causes the release of relays 6AS and 6TD over contacts 6(A'-C')-3, -4, -7, removes ground from leads 6123 and 6125 over contacts 6(A'-C')-8 and -9 and breaks the tip and ring connections on leads 6014–6017 at contacts 6(A'-C')-3 through -6. Release of relay 6TD at contact 6(A'-C')-7 removes a constant signal on lead 7020 to the data set 197 due to the 6TD-2 contact (FIG. 7) destined for computer 198 which is indicative of the fact that call disposition monitor 196 was in use. Conversely, a monitor-out-of-use signal on lead 7010 to data set 197 is transmitted via contact 67D-3. Release of relay 6AS in turn causes relay 6ASA to release which in turn causes the release of relay 7AST at timer 713.

Relay 6ICD operated prevents relay 6MCA from reoperating at contact 6ICD-3 and provides an intercall gap to insure that a new call will not seize the call disposition monitor 196 within 60 milliseconds after release of the previous call. This gap enables downstream computer 198 to distinguish one call from another. Note that the relay 6ICD will remain operated either over contact 6ASA-1 as long as relay 6ASA is operated or in the event that a new ground from a different sender is presented on lead 4204 via diode 68 and contact 6ICD-2 or until the release of relay 6RLC causes contact 6RLC-1 to open. All the aforementioned conditions must be satisfied for relay 6ICD to release.

Relay 6RLC releases 60 milliseconds after it operates and causes relay 6MC over contacts 6MC-2, 6RLC-3 and 6ICD-4 and relay 6ICD over contact 6RLC-1 to be released. Release of relay 6ICD permits the 6SR relay to release due to contact 6ICD-1 and to enable relay 6MCA to operate over contact 6ICD-3 (as described earlier) upon receipt of a new ground signal over lead 4204.

The aforementioned description has assumed that the called party had answered so that immediate normalization of sender 190 was necessary and the split condition of incoming trunk circuit 110 was removed . If this is not the case, then leads 6115 and 6114 are supplied to a conventional threshold tone detector 777. The output thereof is connected to an emitter-follower amplifier circuit comprised of transistors 71 and 72 and resistors 70 and 79 and used to drive relay 7DET. The latter relay provides isolation between tone detector 777 and the remaining timing circuitry of FIG. 7, sends the received signal tone via make contact 7DET-1 to data set 197 on lead 7000 for downstream computer 198 and operates a 7W-7Z relay circuit during receipt of the initial signal tones to permit an on-site preliminary categorization of call disposition to be made.

Preliminary signal categorization is achieved by examining the duration of the initial positive period or ON time of the first signal tone cycle received at tone detector 777, the following negative OFF time period or gap, if necessary, and the second ON signal, if necessary, to determine whether the type of tone received is in one of several categories or category groups described hereinafter. In my illustrative embodiment it is desirable to distinguish between audible ring, voice or busy-recorder (hereinafter respectively referred to as AR, VO and BRO). Trunk cut-through is initiated immediately after an AR or VO disposition is preliminary determined. If, however, the received signal tone appears to be in the BRO busy-recorder group category, sender normalization is further delayed because more time is needed to determine whether the received signal tone represents a busy signal or reorder signal. Thus on a preliminary BRO indication, trunk cut-through is caused to be delayed an additional 0.94 seconds to enable additional signals to be transmitted to computer 198 while maintaining the split trunk condition in case of quick customer hangups in response to the received signals.

Preliminary tone classification or categorization for the purpose of determining when the sender should be normalized and trunk cut-through restored, is based in my illustrative embodiment on the following criteria. AR is determined if the first ON time is $\geq$ 0.7 seconds or if the first gap of the first signal tone cycle is $\geq$ 0.8 seconds. VO is determined if the first ON time is < 0.7 seconds and either the gap is < 0.12 seconds or the second ON time is < 0.15 seconds. A BRO condition is preliminarily determined if the first ON time is < 0.7 seconds, the first gap is $\geq$ 0.12 seconds but < 0.18 seconds and the second ON time is $\geq$ 0.15 seconds. Note that in the BRO situation downstream computer 198 will require additional information free from possible spurious speech and voice interferences generated at the calling side of the split in trunk circuit 110. The algorithms employed by computer 198 are based on an examination of a minimum number of tone cycles or service received via lead 7000, using the durations of various ON and OFF times as the determinative criteria. If more than the minimum number of tone periods are received, more complex tests employing periodicity and duty cycle of signal tone are available to provide increased accuracy of results. Thus, for example, busy would be distinguishable from reoder since the periodicity of the latter signal is twice as great as that of the former.

The output signal of tone detector 777 operates the 7DET relay during the ON portions of received signal tone. Operation of the 7DET relay in turn drives a well-known W-Z relay circuit whose operation is described in U.S. Pat. No. 1,751,263 issued to O. Cesareo on March 18, 1930. In accordance therewith, the 7W-7Z relay circuit is employed to control timers 711 and 714 through 718 of my call disposition monitor circuit arrangement. Each of timers 711 through 718 employed in my arrangement may be comprised of a capacitor-resistor timing circuit controllable by the polarity of its input signal as described in *The Design of Switching Circuits* by Keister, Ritchie and Washburn, 1951, pages 384–395. Thus, for example, the operation of timer 714 is controlled by the state of the 7W relay over contacts 7W-6 and 7W-7 whereby the operation of relay 7W with relay 7Z nonoperated causes timer 714 to begin timing for a predetermined interval of 0.7 seconds. Timer 714 is restorable by the release of the 7W relay or the operation of the 7Z relay.

The first ON time that operates relay 7DET also operates relay 7W via contact 7W-2. Relay 7W remains operated during the first ON time and the following gap as described in the aforementioned Cesareo patent. Timer 714 set for 0.7 seconds, upon time-out operates relay 7AR1 which locks over contact 7AR1-1 and 6RLC-9. This relay operation signifies that the initial ON time is long enough to be AR. Relay 7AR1 operated operates relay 6SR over contact 7AR1-4 to initiate sender normalization and trunk cut-through and sends an AR signal by way of contact 7AR1-3 over lead 7040 to data set 197. If the ON time duration is less than 0.7 seconds timer 714 is reset at break contact 7Z-9 without relay 7AR1 operating. Removal of the first ON signal causes relay 7Z to operate over break contact 7Z-2. Relay 7Z remains operated during the gap and for the duration of the second ON time. Operation of relay 7Z activates timers 715 and 716 over contacts 7W-3 and 7Z-3 through 7Z-6 and operates relay 7SS1 via make contacts 7Z-8 and 7W-8 and break contact 7AR1-2. Relay 7SS1 is held to ground by contacts 7SS1-1 and 6RLC-5. Timer 715 times to see if the gap is greater than 0.8 seconds which would indicate AR. If so, relay 7AR2 operates locking to battery over contacts 7AR2-1 and 6RLC-9, causing relay 6SR to operate over contact 7AR2-5, to initiate sender normalization at monitor connector 194 and to transmit an AR signal over contact 7AR2-3 and lead 7040. Timer 716 times to see if the gap $\geq$ 0.12 seconds and if so operates relay 7LG1 which is held over contacts 7LG1-3 and 6RCL-9. This prepares relay 7BR1 to operate over contact 7LG1-1, should the gap be less than 0.8 seconds (ruling AR out) when the second ON time begins and relay 7W releases. If neither timer 715 nor 716 is operated when relay 7W releases, relay 7SG1 operates over contacts 7Z-8, 7W-9 and 7LG1-2 and is held over contacts 7SG1-1 and 6RLC-5. Operation of relay 7SG1 in conjunction with relay 7SS1 causes operation of relay 6SR over contacts 7SS1-4 and 7SG1-3, sender normalization and generation of a VO categorization over contacts 7SS1-3 and 7SG1-2 on lead 7060 to data set 197.

Knowing that the first ON and OFF periods fall within the parameters necessary to determine a BRO indication, without more, is insufficient to permit positive BRP identification to be made since voice can sometimes resemble a busy or reorder signal pattern. Therefore, an additional test is required before a BRO group categorization can be made. Timer 717 is activated upon release of relay 7W over contacts 7W-4 and 7W-5 and times the second ON time to see if it is greater than or equal to 0.15 seconds, the shortest expected reorder signal. Relay 7BR2 operated by way of contacts 7AR2-4 and 7LG1-4 and held operated by contacts 7BR2-1 and 6RLC-9 along with relay 7BR1 operated over contact 7AR2-2 and held by contacts 7BR1-1 and 6RLC-5, together, result in the generation of a BRO classification over contacts 7BR2-2 and 7BR1-2 over lead 7050 to data set 197. In addition, operated relay 7BR2 activates timer 711 over contacts 7BR1-3 7BR2-3 and 7BR2-4 which times for an additional 0.94 seconds and upon timeout operates relay 7BRI which in turn operates relay 6SR over contact 7BRT-1 and normalizes sender 190. If the second ON time is less than 0.15 seconds, relay 7SS2 operates over contacts 7Z-7, 6RLC-8, 7SS1-2, 7BR2-5 and 7BR1-4 and locks to ground over contacts 7SS2-2 and 6RLC-5. This results in a VO classification transmitted over contact 7SS2-1 on lead 7060 to data set 197 and in sender normalization due to the operation of relay 6SR over contact 7SS2-3.

Operation of relay 6SR, in addition to initiating sender normalization, disables the 7W-7Z relay combination by removing battery from their windings at contact 6SR-5. Thus, these relays will not follow the many ON and OFF times that may accompany each call, thereby permitting the aforementioned timer to remain inactive after preliminary call categorization is obtained. It should be noted that the AR, VO and BRO call categorizations sent via leads 7000, 7010, 7020, 7040, 7050 and 7060 to computer 198 via data set 197 (FIG.1) and the apparatus associated therewith may optionally be omitted since they play no actual role in the computer analysis of the call dispositions and are significant only in that they are useful as a tool for checking the accuracy of call disposition monitor 196.

It should also be noted that various leads may be derived at call selector 193 connector over cable 430 via contacts 5A2-6 through -10 and multipled onto cable 530 (FIG. 5). This cable may for example, contain five leads from pulse transmitter 474 of sender 190, to transmit a two-out-of-five MF multifrequency tone pattern to downstream computer 198 via data set 197 so that the computer may know the called number associated with the call being analyzed.

In addition to the aforementioned arrangement and method, several precautionary features may be incorporated. Timer 712 insures that if either a disposition signal or answer supervision is not received within 20 seconds the call will be disconnected from the monitoring circuitry. As described supra the completion of outpulsing is sensed on lead 4204 and subsequently results in the operation of relay 6MC. Timer 712 is activated via contacts 6SR-6 and transfer contacts 6MC-9 and 6MC-10 to time for a period of 20 seconds or until a disposition signal or answer supervision indication, which results in the operation of relay 6SR, is received, whichever occurs first. Upon timeout, relay 7HDT operates and is held by contact 7HDT-1 and capacitor 7C1 for several milliseconds before releasing. Relay 7HDT operated holds relay 6RLC over contact 7HDT-2 to release call disposition monitor 196 and monitor connector 194 from the call.

An overall timer 718 limits the monitoring of the call to 60 seconds after sender normalization which occurrence is represented by the operation of relay 6SR. It inhibits calls that do not answer from being attached to call monitor connector 194 for longer than 60 seconds. Restoration of timer 718 over contacts 6RLC-7 and 6SR-7 and -8 before time-out, occurs upon operation of relay 6RLC. Upon time-out, relay 7OT operates causing the operation of relaly 7RIC over contact 7OT-1 to release call disposition monitor 196 and monitor connector 194 from the call.

If the situation arises that the calling party abandons the call after sender 190 has been connected to monitor selector 193 but before ground has been presented on lead 4204 thereof, then relay 6BC is operated according to the following sequence. An abandonment by the calling party releases relay 4L in sender 190 and thereby causes relay 4SRE to be released due to contact 4L-1. This sequence operates relay 4LR of sender 190 via make contact 40N2-55 and break contacts 4AV1-7 and 4SRE-1 on lead 4100. Lead 4100 thus presents ground through monitor selector 193 and to monitor connector 194. Operation of the 4LR-1 contact (FIG. 6) presents ground to operate relay 6BC via the make contacts of 4LR-1 and 6CM-4 and break contacts 6SR-4 and 6BC-1. Relay 6BC locks to ground over make contact 6BC-2, prevents relay 6MCA from operating via break contact 6BC-4, prevents ralay 6TD from operating at contact 6BC-5 and operates relay 6RLC over contact 6BC-3. Relay 6RLC operated, operates, relay 6SR via contact 6RLC-1, thus transferring the ground later presented on lead 4204 over contacts 6CM-3 and 6SR-3 back to the winding of the 4AV1 relay of sender 190 via lead 4203. This permits normalization of sender 190 upon receipt of the release signal by the operation of its relay 4AV1 as described supra.

Thus, I have shown an illustrative embodiment of my invention in which call disposition signals may be reliably detected in a toll or tandem switching center. Spurious and random speech and noise energy emanating from the calling side of the incoming trunk circuit is prevented from interfering with the detection of the disposition signal tones by making use of the circuitry which normally split the trunk incident to the attachment of the sender. The split condition is prolonged a sufficient time after completion of the outpulsing to enable an accurate determination of the disposition signal.

It will be apparent to those of skill in the art that numerous modifications of the embodiment described herein may be made without departing from the spirit and scope of the invention. Thus, for example it should be apparent that call selector 193 and monitor connector 194 may serve any number of senders or even groups of senders where each sender group may be associated with a different switching machine. In addition, timers employed in call disposition monitor 196 need not be necessarily set for the time intervals assigned in my preferred embodiment nor need the disposition categories be confined to distinguishing BY, RO, AR and VO from each other since my arrangement is readily adaptable to detect any disposition of interest occurring after sender outpulsing. It is also apparent that my monitoring arrangement is applicable not only to toll and tandem central offices as described heretofore but in addition, to either originating or terminating local central switching exchanges. Numerous other modifications of the embodiment will be apparent to those of ordinary skill in the art.

What is claimed is:

1. In a telecommunications switching system in which call disposition signals are applied during the establishment of a connection, said system including a plurality of terminal path circuits for transmitting call signaling information and means for splitting the called from the calling sides thereof operative incident to the processing of call signaling information, the improvement comprising:
   means for initially prolonging the split condition of said terminal path circuits following the completion of said processing of call signaling information,
   means connected to one of said sides of said terminal path circuits when in said split condition for classifying predetermined ones of said disposition signals received from said one of said sides in the absence of interfering signals generated at the other of said sides, and
   means controlled by said classifying means indicating its inability to distinguish among certain of said disposition signals for further prolonging the split condition of said terminal path circuits.

2. In a telecommunications switching system in which the call disposition signals are applied during the establishment of the connection, said system including a plurality of trunk circuits having means for splitting the called from the calling sides thereof incident to the attachment of a sender for transmitting call signaling information, the improvement comprising:

means for initially prolonging the split condition of said trunk circuits following the completion of said transmitting by said sender, means connectable to said trunk circuits for particularly classifying predetermined ones and for generally classifying according to a corresponding disposition signal group other ones of said disposition signals received therefrom, and means responsive to said classifying means determining the occurrence of said other ones of said disposition signals for further prolonging said split condition of said trunk circuits.

3. The invention in accordance with claim 2 wherein said classifying means comprises:

means connectable to the called side of said trunk circuits for detecting the portions of said received disposition signals exceeding a predetermined threshold voltage.

4. The invention in accordance with claim 3 wherein said classifying means further comprises:

means controlled by said detecting means for timing said threshold-exceeding portions of said signals and the intervals therebetween.

5. The invention in accordance with claim 4 wherein said classifying means further comprises:

means responsive to said timing means during said initially prolonged split condition for distinguishing among combinations of durations of said threshold-exceeding portions and said intervals therebetween.

6. The invention in accordance with claim 5 wherein the improvement further comprises:

means connectable to said trunk circuits during said prolonged split condition for analyzing said other ones of said disposition signals to determine the occurence of particular ones of said disposition signals in said disposition signal group.

7. The invention in accordance with claim 5 wherein the improvement further comprises:

means controlled by said distinguishing means determining the occurrence of a predetermined combination of said durations for removing said split condition of said trunk circuits.

8. In a telecommunications switching system in which each of a group of signals applicable at a destination side of a cross-office connection during the establishment of a call thereover has a unique tone pattern and represents a distinct disposition of said call, said system including one of a plurality of trunk circuits seized for use to establish said call and operable in a split condition wherein any of said group of signals applied at said destination side is isolated from other signals generated at an originating side of said one of said trunk circuits, an arrangement for automatically monitoring said one of said trunk circuits to determine an actual disposition of said call comprising:

means for maintaining said one of said trunk circuits in said split condition subsequent to the establishment of said call, and means connected to said destination side of said one of said trunk circuits and operative during the continuance of said split condition by said maintaining means for detecting only a one of said group of signals representing said actual disposition in response to a receipt of a tone pattern thereof in the absence of interference by said other signals generated at said originating side.

9. The system in accordance with claim 8 wherein said detecting means comprises:

means for sampling said tone pattern of said one of said group of signals representing said actual disposition, logic means connected to said sampling means to receive said last-mentioned tone pattern for preliminarily classifying some of said group of signals as at least representing a category of dispositions and for classifying any one of others of said group of signals as actually representing a particular disposition, means responsive to said logic means classifying said any one of others of said group of signals as actually representing said particular disposition for removing said split condition from said trunk, and means responsive to said logic means preliminarily classifying said some of said group of signals as representing said category of dispositions for further prolonging said split condition.

10. The system in accordance with claim 9 wherein said category of dispositions is a called circuit unavailable category, said actually represented particular disposition is taken from the set of dispositions including an audible ring disposition, a voice disposition, a called party answer disposition and a calling party abandon disposition, and said logic means further comprises means for distinguishing among said set of dispositions and said called circuit unavailable category.

11. The system in accordance with claim 10 wherein said called circuit unavailable category includes a busy disposition and a reorder disposition, further comprising:

means operative during said further prolonging of said split condition for further distinguishing between said busy disposition and said reorder disposition.

12. In a switching system wherein one of a plurality of trunk circuits is seized for connection to a cross-office communications path, is normally operated during the establishment of said path in a split condition wherein the called side thereof is split from the calling side thereof and is released by a calling party upon hearing particular types of tone, live tone analysis circuitry comprising:

a bistate threshold tone detector, means for connecting the called side of said seized one of said plurality of trunk circuits in said split condition to said tone detector, and means for selectively maintaining said seized one of said plurality of trunk circuits in said split condition in accordance with the type of tone received by said tone detector.

13. The system in accordance with claim 12 further comprising:

relay means having on and off output periods for indicating whether said tone detector is in a threshold-exceeding state, multistate circuit means having operating states corresponding in duration to particular on periods and off periods of said relay means, transmitting means connected to said relay means for sending to a computer particular combinations of a minimum number of on and off periods, means controlled by said multistate circuit means for timing said operating states corresponding to said on and said off periods, logic circuit means responsive to said controlled means timing said on and said off periods for determining whether said received tone is one of said particular types of tone causing said calling party release, means included in said selective maintaining means for removing said split condition in response to said logic circuit means determining that said tone is not one of said particular types of tone, timeout circuit means included in said selective maintaining means for further maintaining said seized one of said plurality of trunk circuits in said split condition in response to said logic circuit means determining that said received tone is one of said particular types of tone to prevent said calling party from releasing said seized one of said plurality of trunk circuits before said transmitting means has completed sending said minimum number of on and off periods to said computer.

* * * * *